May 2, 1967 D. SPORTE 3,317,063
BUNCHING AND STACKING DEVICE
Filed July 27, 1964 2 Sheets-Sheet 1
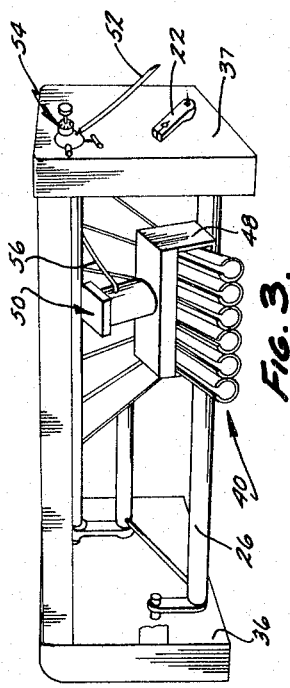
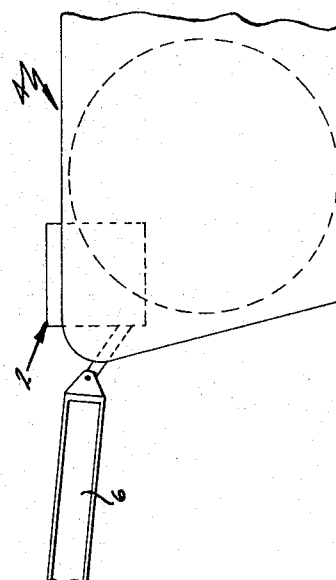
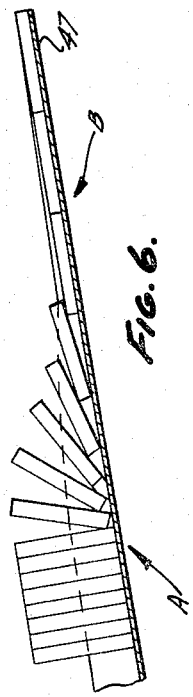
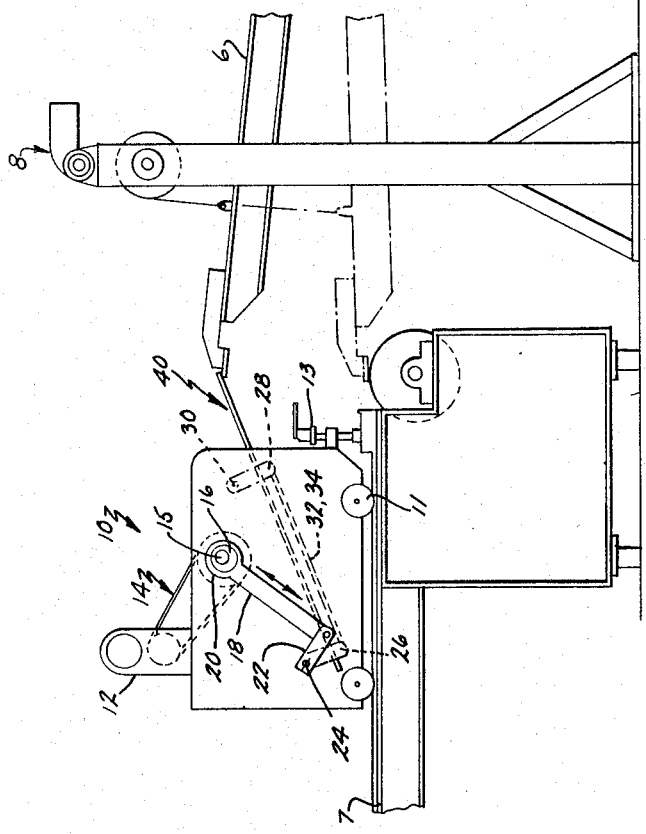
INVENTOR.
DICK SPORTE
BY
ATTORNEYS May 2, 1967 D. SPORTE 3,317,063
BUNCHING AND STACKING DEVICE
Filed July 27, 1964 2 Sheets-Sheet 2

INVENTOR.
DICK SPORTE
BY
ATTORNEYS

United States Patent Office 3,317,063
Patented May 2, 1967

3,317,063
BUNCHING AND STACKING DEVICE
Dick Sporte, Grand Rapids, Mich., assignor to Werner Machinery Company, Grand Rapids, Mich., a corporation of Michigan
Filed July 27, 1964, Ser. No. 385,371
3 Claims. (Cl. 214—7)

This invention relates to a bunching and stacking apparatus, and more particularly to a device for segregating or bunching into groups a continuous succession of relatively firm objects having a generally rounded, wafer-like configuration, as the same are supplied from a conveyor means, for example, and which automatically stacks on edge the wafers in the groups so segregated or bunched.

As production methods have become increasingly automated, the use of conveyor apparatus has accordingly become more and more extensive, resulting not only in a great advancement in the complexity and versatility of conveyor devices themselves, but also in the birth and advancement of new types of devices designed to cooperate with the conveyor devices so as to accomplish new operations, and to accomplish them in a more effective manner. One such new device addressed itself to the multiple problems of collecting generally flat objects from the surface of a conveyor belt upon which they are being moved, separating such objects into groups once the same have been collected, and causing the objects to be stood edgewise upon their ends and stacked one against the other while maintained in this position. This entire operation had, early in the state of this art, been performed by hand, but in time it too became automated, through the use of various intricate and involved machine operations, including such as multiple cam and switch-actuated mechanisms, multiple crossing conveyor means, and other similarly complicated and expensive devices.

The main object of this invention is the provision of a device for performing the above-described bunching and stacking operation in a manner that is at once more effective than previous devices, and yet easier and more economical to manufacture, which requires less upkeep and is subject to less wear and tear after prolonged usage.

Another object of this invention is the provision of such a device which comprises but a single step in a continuous conveyor operation, and thus may if necessary be easily removed and utilized elsewhere, or be removed for service etc.

Yet another object of this invention is the provision of an adjustable and movable bunching and stacking means such as has been noted.

This invention doubtless has many additional objects and advantages, as will be manifestly apparent to those skilled in the art upon consideration of the following specification, taken in conjunction with the accompanying drawings, wherein:

FIG. 1 is an elevational view of a representative conveyor operation, showing a preferred manner of utilizing the novel bunching and stacking device disclosed herein;

FIG. 3 is a perspective view of a modification of the bunching and stacking device;

FIG. 6 is an elevational sectional view of the single chute means of FIG. 5, illustrating the manner in which it performs its function by means of the series of wafer-like objects shown in phantom.

Figure 2:
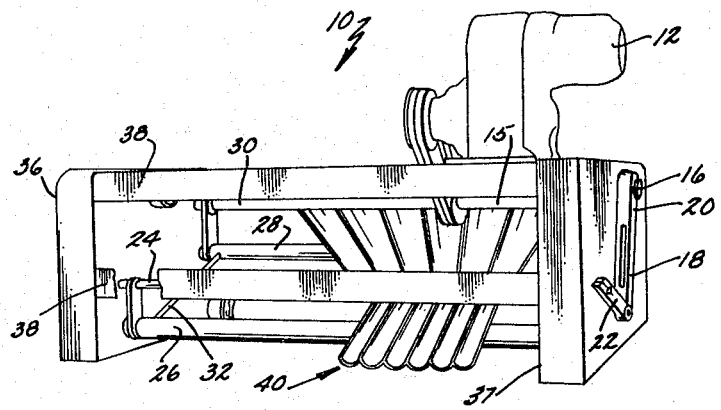
FIG. 2 is a perspective view of the bunching and stacking device.

The inventive concept underlying this invention lies in the provision of an array of unique chute means, each chute means in the array being shaped so as to have an upper extremity with a generally flat bottom, and upstanding side portions, all of which gradually become concave and merge as the chute becomes increasingly narrow over its length, until at the lower extremity the side portions and bottom surface of the chute form an open concave tube of generally circular cross-section. The flat-bottomed upper extremity of each individual chute means is at least twice as wide as the narrowed tube-like lower extremity, so that each chute may perform its function of collecting or bunching two or more wafers from a row of many of the same, brought to the chute by conveyor means. Also, the lower extremity (i.e., the semi-tube portion) of each chute means may be extended from the upper portion thereof at any particular angle that suits a specific installation requirement, so that the bunched wafers may, after having been stacked, be routed to other equipment alongside the bunching and stacking device. The several chute means are mounted adjacent one another so as to form an array having a downwardly-inclined surface, down which the discs or wafers from the conveyor may slide, from the wider flat upper extremity of each chute to the narrower rounded tube-like portion at the lower extremity. The array of chutes rests upon transverse supports which are preferably adapted to be driven in a sharply reciprocating or vibrating motion, through mechanical linkages which interconnect the supports with a suitable source of such vibrations. These transverse supports impart their own vibratory movement to the chute means within the array which they support. If desired, however, other means may be utilized for vibrating the array of chutes and wafers therein, including a variety of pneumatic heads of conventional design. If the latter device be preferred, the transverse supports upon which the array of chutes rests are not themselves vibrated or reciprocated but instead may be rotatably adjusted to vary the angle of elevation of the array. The unique configuration of each chute in the array, together with the vibratory motion imparted to them and the interaction of discs supported thereupon as the same press against each other, causes the downwardly sliding discs to first slide in single file one behind the other, no matter how many originally entered the chute, and secondly to gradually begin to stand erect upon their sides and to become stacked one behind the other in this erect position. The discs then emerge from the lower portion of each chute as a continuous edgewise stack, and may then be immediately removed, as for packaging, or may be continued upon additional conveyor means, as for further operation.

Referring now in more detail to the drawings, in FIG. 1 a portion of the typical conveyor operation is shown, with my inventive bunching and stacking means integrated therein. Such a conveyor operation may include one or more adjustable take-off knife devices 2, which remove the discs or wafers (not shown in this view) from a first conveyor device 4, which is here assumed for purposes of illustration to be an oven through which cookies travel as they are baked. The take-off knife 2, which operates in a known manner and is shown here only as environment, transfers the baked cookies from the oven device 4 to a conveyor belt means 6, the cookies lying flat upon the horizontal surfaces of both the oven and the conveyor belt in spaced rows and columns. A raising and lowering device 8 serves to support the conveyor belt means 6 at its end opposite the oven means and allows the conveyor belt to be positioned so as to transfer the cookies upon its surface to my bunching and stacking device 10, or to further conveyor belt means 7, as desired.

As seen from FIGS. 1 and 2, the bunching and stacking device 10 is constructed basically of two generally parallel side portions 36 and 37, respectively, which are rigidly connected in spaced relationship by means of several fixed structural support members 38, which serve to strengthen and make rigid the frame-work of the device. An empowering means, such as an electric motor 12, by means of a system of pulleys and belts designated generally as 14 drives a shaft 15 which is journaled in the end wall 37 and which has an eccentric 16 mounted on its end outside the end wall. A connecting rod 18, having a yoke means 20 formed in one end thereof is connected to the eccentric 16 and serves to convert its rotary motion into a reciprocating one, as shown by the arrows in FIG. 1. This reciprocating motion drives a second connecting rod 22, pivotally connected to the first rod 18, in a sharply reciprocating fashion. This motion is transmitted by the second rod 22 to a transverse drive rod 24, which is journaled in the two ends 36 and 37 of the device, and to one end of which is connected the second connecting rod 22. A first transverse support 26 is suspended from the drive rod 24, and lies beneath and generally parallel to this rod. The first transverse support 26 serves to support the lower portions of the chutes in the array 40. The upper portions of the chutes are supported by a second transverse support 28, which depends from and is supported beneath a structural support member 30 in much the same manner as the first transverse support 26 is suspended from the transverse drive rod 24. The first and second transverse supports 26 and 28 respectively are interconnected on each side of the device 10 by means of a pair of solid links 32 and 34 respectively. Adjustment means 13 (FIG. 1) serve to position the height of the entire device 10, and the structural support member 30 is preferably made to be vertically adjustable, so as to provide for changing the angle of inclination of the array of chutes 40 to accommodate a variety of sizes and weights of cookies. Additionally, the device 10 is preferably mounted on wheels 11 so that it may be quickly and easily moved to new placements.

Figure 4:
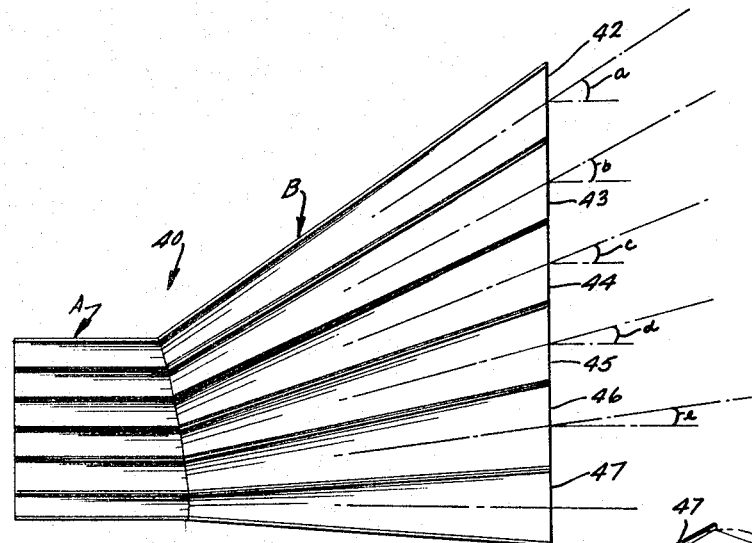
FIG. 4 is a plan view of a preferred array of chute means utilized in the bunching and stacking device.

A preferred embodiment of the array 40 of chutes is shown in detail in FIG. 4. It may there be seen that such an array consists of a plurality of chute portions such as 42, 43, 44, 45, 46, and 47, for example. The chute portions may actually be formed as separate units and mounted independently adjacent each other, or if desired, all of the chute portions 42–47 may be stamped as a unit from a single piece of material such as sheet metal or the like. Regardless of which way they are produced, each chute portion such as 47 has two segments A and B of differing cross sections which may if desired be located at an angle relative to each other, such as for example the angles $a$, $b$, $c$, $d$, and $e$, as particular installation requirements may necessitate.

Figure 5:
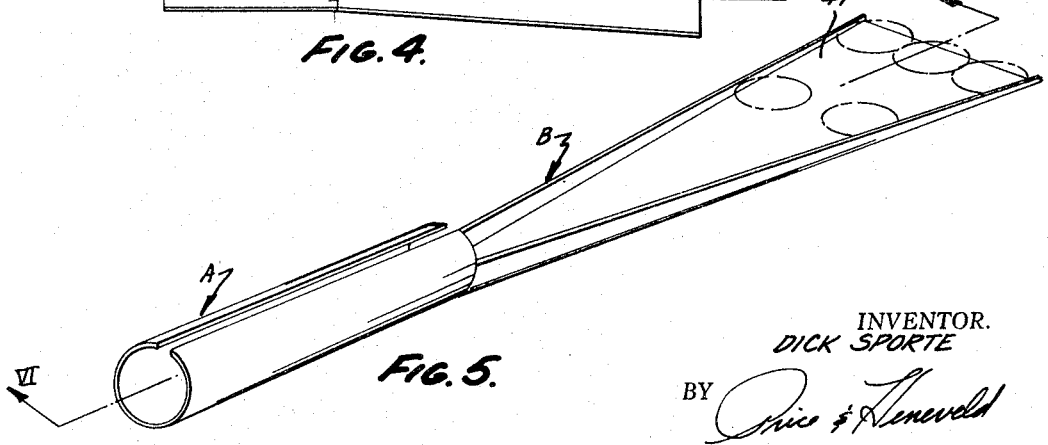
FIG. 5 is a perspective view of a single one of the chute means from the array of FIG. 3.

Each of the chute portions 42–47 in the array 40 of FIG. 4, regardless of the angle at which its segments A and B are positioned, has a particular form of construction which is illustrated in detail in FIG. 5, chute portion 47 with aligned segments A and B having been taken as an example, upon which in phantom is illustratively shown the various positions which downwardly sliding cookies or other discs or wafers may assume as they traverse segments A and B. In FIG. 5 it will be seen that the bottom surface of segment B is generally flat at its uppermost extremity, and that this segment has upstanding walls along each downwardly extending side thereof. The width of each chute portion such as 47 at its upper extremity is at least twice that of the same chute at its lower extremity. The wider upper extremity thus becomes increasingly narrowed as segment B approaches segment A, and as segment B continues to be narrowed, its upstanding wall portions increase in height and gradually become increasingly curved, until at the junction of segments A and B the side portions have merged with the bottom, and the chute has become generally circular in cross section. In contrast to the transition in shape which segment B undergoes, segment A is continuous, its lowermost end having the same rounded cross section as its upper extremity.

In keeping with the description just given of the chute array 40, and of the environment within which it operates, it should be apparent that other types of means for supplying the vibratory movements noted may well be utilized if desired.

One such type is the pneumatic head 50 shown in FIG. 3. If this embodiment is utilized, the electric motor 12 and the system of pulleys and belts 14, together with most of the driven system of rods and linkages described previously, are of course unnecessary and may be omitted. The head 50 is preferably mounted in rigid mechanical contact with the array of chutes 40, as by means of a pair of mounting flanges 48 which clamp the head 50 directly to the array 40, which rests upon transverse support 26 in the same manner as in the embodiment previously described. The angle of elevation of the array may be adjusted by rotating the support 26, as by means of the second connecting rod 22 on the outer side of side wall 37.

The purpose of the pneumatic head is, as indicated before, to vibrate the chutes and their wafers. It accomplishes this by its own sharp vibrations, which are imparted to the array of chutes 40 by the direct mechanical contact there between. In order to operate the pneumatic head, suitable pressurized air is supplied to a pressure-regulating valve and meter 54, as by means of a hose or pipe 52. The valve and meter 54 may conveniently be mounted upon one of the side wall portions of the device, such as for example 37. A second hose or pipe such as 56 supplies the correctly metered and regulated pressurized air from the valve 54 to head 50.

*Operation*

Having fully and completely described my invention, its operation in performing an illustrative task is as follows. Generally rounded dis-shaped wafers, such as cookies or the like, lie flat upon conveyor belt means 6 (FIG. 1), and are conveyed thereby to my bunching and stacking device 10. The cookies are conventionally arranged in continuous columns and in wide rows upon the conveyor belt, and therefore a predetermined number of them, such as three (see FIG. 5), must be selected from such a wide row and deposited upon the flat upper extremity of segment B of a particular chute portion, such as 47. The precise number so selected or bunched, is determined by the width of the upper extremity of the chute means, which performs the bunching function. As seen in FIG. 1, the array 40 of chutes is supported at an upwardly inclining angle from horizontal upon the transverse supports 26 and 28. The forces of gravity are thus caused to act upon the mass of each cookie or wafer (FIGS. 5 and 6) and will tend to cause the same to slowly slide down the chute.

The first and second transverse supports, 26 and 28, upon which the array of chutes 40 is supported, are in turn suspended beneath a transverse drive rod 24 and a structural support member 30, respectively. The two transverse supports are also interconnected at each of their ends, by means of the solid links 32 and 34. Now, if the mechanical type of vibratory means is utilized, the electric motor 12 is energized, driving the system of pulleys and belts 14, and thus causing the eccentric 16 to be rotated. Rotation of the eccentric 16 causes a reciprocating motion to be imparted to the connecting rod 18 through the yoke means 20 formed in its end which follows the motion of the eccentric. The connecting rod 18, through its pivotal connection with the second connecting rod 22, thus drives the transverse drive rod 24 with a reciprocating motion which is preferably of small amplitude and short period, and thus is sudden, abrupt and vibratory in nature.

The motion of the transverse drive rod 24 is transmitted to the first transverse support 26 through the mechanical connection therebetween, and, since the first transverse support 26 is mechanically coupled to the second transverse support 28, the latter will be also vibrated in the same manner. In this manner the cookies or other wafer-like objects bunched upon the upper extremity of each segment B of each chute will be influenced both by the forces of gravity and the sharply vibrating motion of the chute portions upon which they ride.

Since each chute is continuously narrowed throughout the length of its segment B it clearly is impossible for the exemplary three wafers which originally were selected by the chute and which entered it adjacent each other to continue down its length in this alignment. Instead, one of the three will be caused to lead the others, which will follow in succession under the funneling influence of the narrowing segment B. When each of the wafers in the succession contacts the increasingly outwardly rounded upstanding wall portions of segment B, and as the cross section of segment B approaches circularity (i.e., at the junction of segments A and B), each wafer begins to exert a force upon the rear of the preceding wafer, which when added to the force of gravity and vibratory motion to which each wafer is constantly subjected, causes the wafers to be gradually drawn into an upright position, as shown in FIG. 5. As the succession of wafers reaches the bottom of segment A, it will be seen that each wafer has been stacked vertically against its predecessor, and that a continuous stack of wafers emerges from this segment of the chute.

If the pneumatic form of vibratory means be utilized, the operation given above is substantially the same, insofar as it concerns the actual movements undergone by the wafers. The main difference is that the supporting members and their inter-connecting linkages no longer are reciprocated. Instead, the pneumatic head 50 vibrates sharply when pressurized air is supplied to it, and these vibrations are transferred directly to the array 40 by the rigid mechanical contact of the head and the array. Thus, each wafer proceeds down its particular chute portion in the same way, and once again the result is a vertical stacking of wafers one against another.

It may well be that after contemplating this description of my novel bunching and stacking device, others skilled in the art may envision alternate embodiments and certain changes in form which, nonetheless, incorporate the concept underlying my invention. Accordingly, I wish to be limited solely by the express terms of the below-appended claims.

I claim:

1. A device for bunching and stacking a continuous succession of relatively firm, generally flat objects of rounded, wafer-like configuration, comprising: at least one bunching and stacking chute means, having an upper extremity with a substantially flat bottom surface and a generally rounded lower extremity, the width of said bottom surface of said upper extremity at its uppermost portion being greater than the width of said lower extremity for accommodating at least one object upon its flat side; upstanding wall portions on the sides of said upper extremity of said chute, said wall portions progressively decreasing in radius of curvature from the upper portion of the upper extremity to the lower portion thereof where said upper extremity merges with said lower extremity, said flat bottom surface of said upper extremity becoming progressively narrower from said upper portion to said lower portion; means for supporting said chute means in an inclined position; and means for imparting a vibratory motion to said chute means.

2. A device for bunching and stacking a continuous succession of relatively firm, generally flat objects of rounded wafer-like configuration, comprising: at least one bunching and stacking chute means, having an upper extremity with a substantially flat bottom surface and a generally rounded lower extremity, the width of said bottom surface of said upper extremity at its uppermost portion being greater than the width of said lower extremity for accommodating at least one object upon its flat side; upstanding wall portions on the sides of said upper extremity of said chute, said wall portions progressively decreasing in radius of curvature from the upper portion of the upper extremity to the lower portion thereof where said upper extremity merges with said lower extremity, said flat bottom surface of said upper extremity becoming progressively narrower from said upper portion to said lower portion; means for supporting said plurality of adjacent chute means in an inclined position; an eccentric driver and follower means connected to said chute supporting means so as to rotate the same in a reciprocating manner, thereby imparting a vibratory motion to all of said chute means and to any of said wafer-like objects upon the same; and an electric motor adapted to drive said eccentric driver and follower means.

3. A device for bunching and stacking a continuous succession of relatively firm, generally flat objects of rounded, wafer-like configuration, comprising: at least one bunching and stacking chute means, having an upper extremity with a substantially flat bottom surface and a generally rounded lower extremity, the width of said bottom surface of said upper extremity at its uppermost portion being greater than the width of said lower extremity for accommodating at least one object upon its flat side; upstanding wall portions on the sides of said upper extremity of said chute, said wall portions progressively decreasing in radius of curvature from the upper portion of the upper extremity to the lower portion thereof where said upper extremity merges with said lower extremity, said flat bottom surface of said upper extremity becoming progressively narrower from said upper portion to said lower portion; means for supporting said plurality of adjacent chute means in an inclined position; and a pneumatic head for creating mechanical vibrations and for imparting them to said objects and chute means, whereby the same are caused to vibrate.

References Cited by the Examiner

UNITED STATES PATENTS

| | | |
|---|---|---|
| 1,370,695 | 3/1921 | Lile. |
| 1,803,621 | 5/1931 | Jones _____ 214—7 |
| 2,555,602 | 6/1951 | Nutt _____ 198—35 |
| 3,071,236 | 1/1963 | Hahn et al. _____ 214—7 |
| 3,207,288 | 9/1965 | Talbot et al. _____ 214—7 |

GERALD M. FORLENZA, *Primary Examiner.*

J. E. OLDS, *Assistant Examiner.*